May 6, 1941.  H. W. HEM  2,241,347
WEIGHING SCALE
Filed April 25, 1938  3 Sheets-Sheet 1
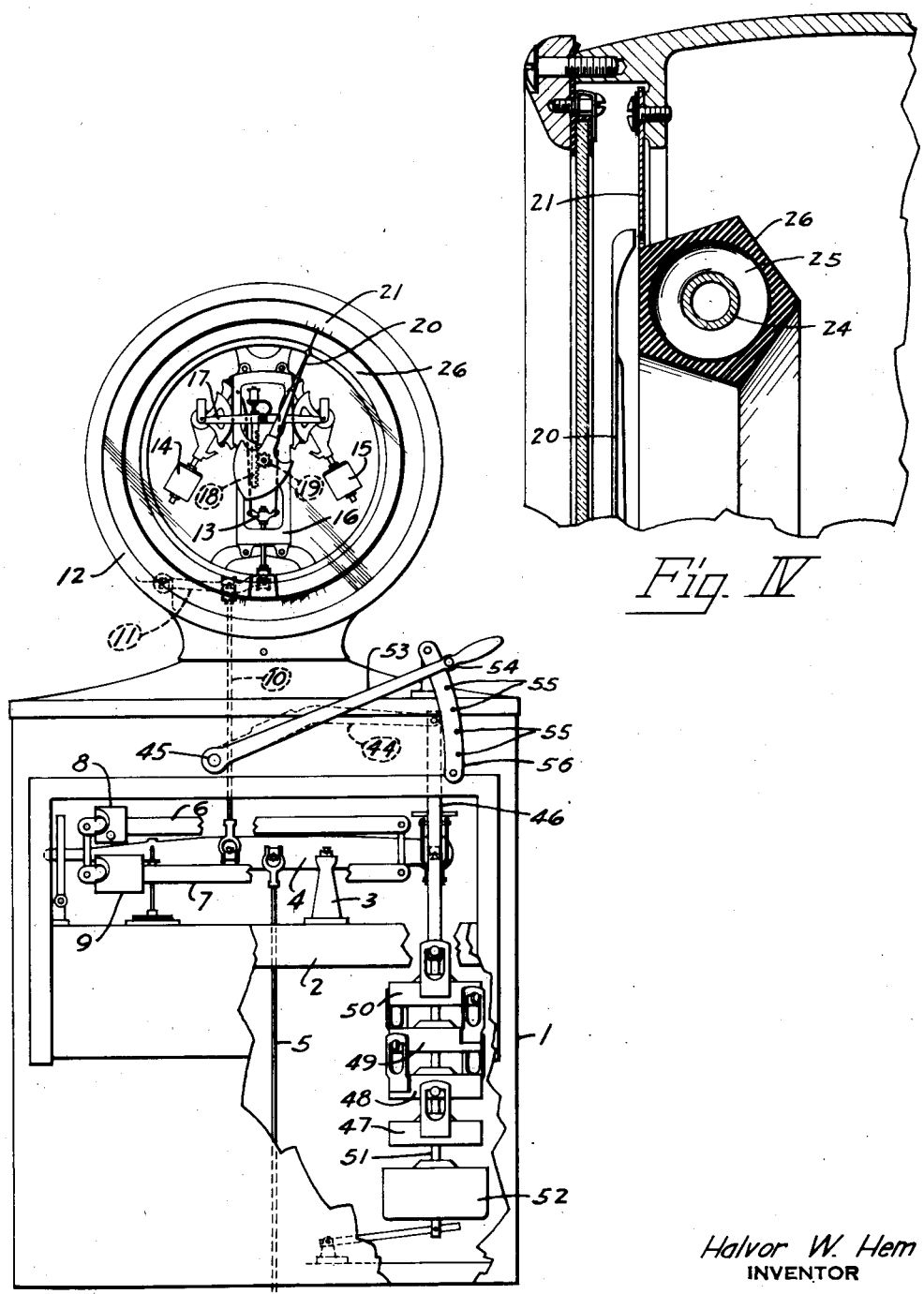
Fig. I
Fig. IV
Halvor W. Hem
INVENTOR
BY Marshall & Marshall
ATTORNEYS

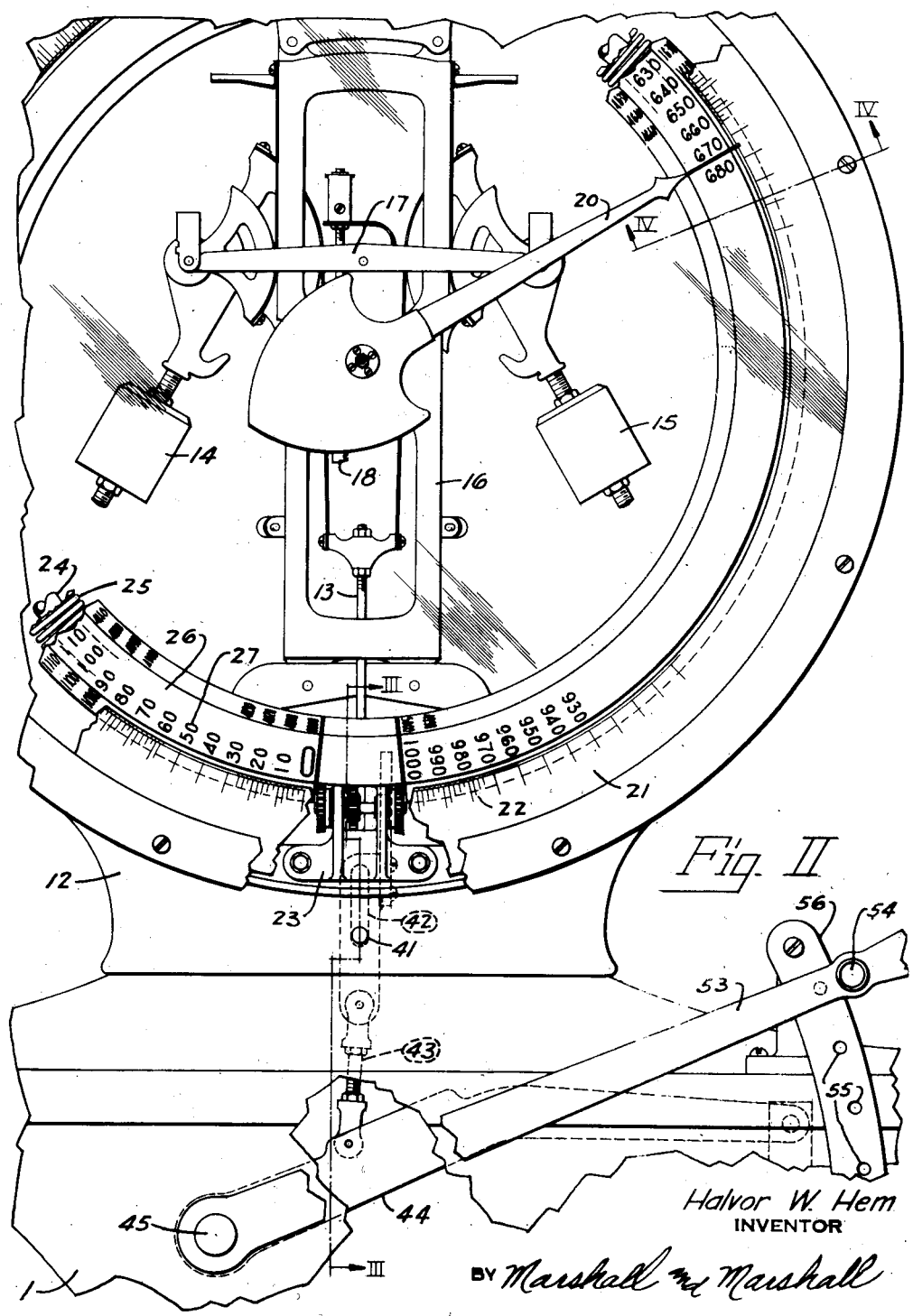

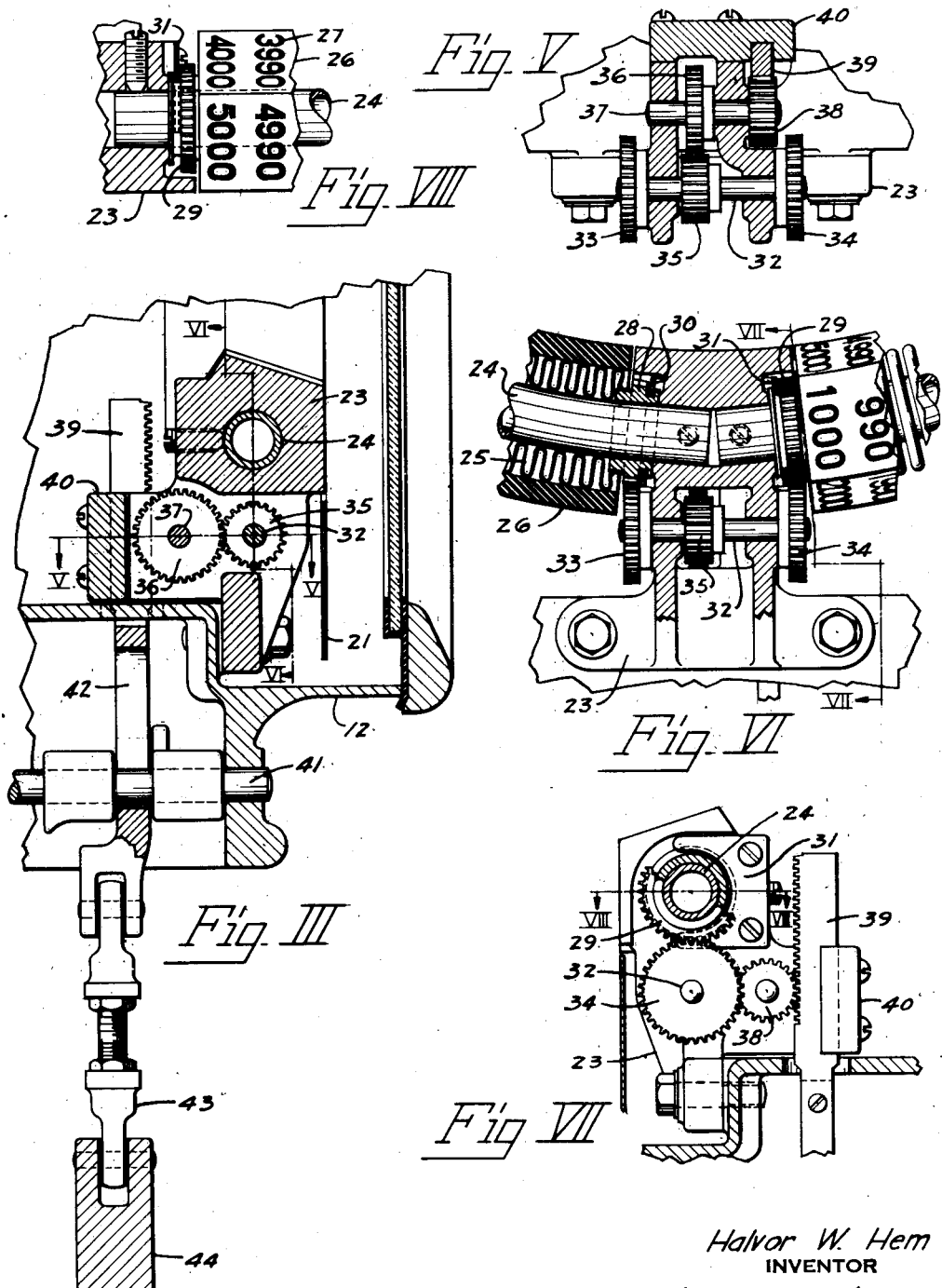

Patented May 6, 1941

2,241,347

UNITED STATES PATENT OFFICE 2,241,347

WEIGHING SCALE

Halvor W. Hem, Toledo, Ohio, assignor to Toledo Scale Company, a corporation of New Jersey Application April 25, 1938, Serial No. 204,008

2 Claims. (Cl. 265—48)

This invention relates to weighing scales, and particularly to means for indicating total weights counterbalanced by automatic load-counterbalancing mechanism and manipulative load-counterbalancing mechanism acting together.

Its principal object is to provide improved means for selectively displaying a plurality of series of figures, each series beginning with a figure corresponding to the load-counterbalancing capacity of a manipulative weight, and having a range of figures corresponding to the load-counterbalancing capacity of the manipulative weight plus the weights of loads capable of being counterbalanced by automatic load-counterbalancing mechanism, a proper series of figures being automatically displayed when manipulative load-counterbalancing mechanism is operated.

A more specific object of the invention is to combine a changeable chart bearing a plurality of series of figures with mechanism for depositing load-counterbalancing weights so that upon deposit of one or more of such load-counterbalancing weights a series of figures corresponding to the load-counterbalancing capacity of the weight plus weights capable of being counterbalanced by automatic load-counterbalancing mechanism is brought into proper cooperative relationship with an indicator.

Other objects and advantages will be apparent from the following description, in which reference is had to the accompanying drawings illustrating a preferred embodiment of my invention and wherein similar reference numerals designate similar parts throughout the several views.

In the drawings:

Figure I is a front elevational view of a cabinet and dial housing of a weighing scale embodying my invention, parts of the cabinet and of beams being broken away to disclose unit load-counterbalancing weights and connections;

Figure II is an enlarged fragmentary front elevational view of the automatic load-counterbalancing and the indicating mechanism employed in the scale illustrated in Figure I;

Figure III is a further enlarged fragmentary sectional side elevational view taken substantially on the line III—III of Figure II;

Fig. IV is a similar further enlarged fragmentary sectional view taken on the line IV—IV of Figure II;

Figure V is an enlarged fragmentary sectional plan view taken on the line V—V of Figure III;

Fig. VI is an enlarged fragmentary front elevational view, parts being in section along the line VI—VI of Figure III;

Figure VII is a fragmentary side elevational view, parts being shown in section substantially along the line VII—VII of Figure VI; and Figure VIII is an enlarged fragmentary plan view with parts shown in section substantially along the line VIII—VIII of Figure VII.

Referring to the drawings in detail, the invention is shown as incorporated in a weighing scale head of the type illustrated and fully described in United States Patent No. 1,423,660, to Halvor O. Hem.

Within the cabinet 1 is a shelf 2 upon which is fixed a fulcrum stand 3 that pivotally supports a lever 4, the lever 4 being connected by means of a rod 5 to the load-supporting levers of the scale (not shown). The lever 4 is equipped with beams 6 and 7, upon which are slidably mounted tare and capacity poises 8 and 9. A link 10 extends upwardly from a pivotal connection with the lever 4 to a pivotal connection with a short lever 11 which is fulcrumed within a dial housing 12. The short lever 11 in turn is connected, by suitable connections 13, to automatic load-counterbalancing pendulums 14 and 15 which are supported on a frame 16. Connecting the pendulums 14 and 15 is a compensating bar 17, at the center of which is carried a rack 18, the arrangement being such that as the pendulums swing outwardly and upwardly under the influence of a load, the rack moves vertically upwardly.

Rotatably mounted on the frame 16 is a pinion 19, the teeth of which mesh with the teeth of the rack 18, and fixed upon the pinion shaft, to rotate therewith, is an indicator hand 20. The point of the indicator hand 20 swings over an annular chart 21 upon which are marked graduations 22 adapted to cooperate with the point of the indicator hand and indicating the weights of loads.

The weighing and indicating mechanisms so far described are known; therefore, they have been described only in such detail as will suffice for a clear understanding of my invention therewith.

The figures which evaluate the marks 22 on the chart 21 instead of being printed directly on the chart are printed upon a flexible rotatable member.

Fastened within the lower part of the dial housing 12 is a bracket 23, and fixed in sockets in the bracket 23 are the ends of a rigid tube 24 which is bent into circular form and extends around the interior of the dial housing, lying within and somewhat to the rear of the annular chart 21. Rotatably mounted on the rigid tube 24 is a flexible corrugated metallic tube 25, and surrounding the tube 25 and turnable therewith is a sheath 26, preferably of polygonal cross section, upon each of the flat outer faces of which is printed a series of figures 27. The sheath 26 is preferably made of soft material, such as rubber or synthetic rubber-like substance. Fixed to the ends of the flexible corrugated tube 25 and rotatably mounted on the rigid tube 24, adjacent its ends, are pinions 28 and 29 having grooves in their hubs which are engaged by forks 30 and 31 that serve to prevent the pinions from shifting axially.

Journaled in the bracket 23 is a rotatable shaft 32, to the ends of which are fixed gear wheels 33 and 34 and in the center of which is fixed a pinion 35. Meshing with the pinion 35 is a gear wheel 36 which is fixed upon a shaft 37 rotatably mounted in the bracket 23, and also fixed upon the shaft 37 is a pinion 38 adapted to be turned by vertical reciprocating movement of a rack bar 39. The rack bar 39 is slidably mounted in a retaining piece 40 fixed to the bracket 23 and is guided in its vertical movement by a pin 41 which passes through a vertically extending slot 42 in the rack bar 39. The flexible corrugated tube 25 being rotatable about the fixed tube 24 as an axis, when the rack bar is moved vertically the flexible corrugated tube with its sheath 26 is turned to move the printed faces of the sheath successively into cooperative relation to the chart 21.

The lower end of the rack bar 39 is pivotally connected, by means of a link 43, to an arm 44, one end of which is fixed to a rockshaft 45 mounted within the cabinet 1 and extending through the front wall thereof. From the other end of the arm 44 depends a hanger 46, to the lower end of which is suspended a chain of load-counterbalancing weights 47, 48, 49 and 50. Suspended, by means of a rod 51, from the beam lever 4 is a poise pan 52. The chain of load-counterbalancing weights 47, 48, 49 and 50 is so hung above the poise pan 52 that when the arm 44 is swung downwardly, the load-counterbalancing weights 47, 48, 49 and 50 are successively deposited upon the poise pan 52, in which position they serve to counterbalance loads on the scale platform.

To facilitate the deposit and removal of the load-counterbalancing weights 47, 48, 49 and 50, a handle 53 is fixed to the projecting end of the rockshaft 45, the handle being provided with a releasable catch 54 adapted to engage in any one of a series of holes 55 in a quadrant 56 mounted upon the cabinet 1. When the operator of the scale desires to deposit the load-counterbalancing weight 47 on the poise pan 52, he releases the catch 54 from the uppermost hole in the quadrant 56 and drops the handle 53 until the catch 54 engages the second hole. With the handle in this position, the lowermost weight 47 rests upon the poise pan 52, while the load-counterbalancing weights 48, 49 and 50 still hang from the arm 44. Upon further lowering the handle 53, the load-counterbalancing weight 48 is deposited on top of the load-counterbalancing weight 47. Thus the load-counterbalancing weights may be successively transferred to the poise pan 52. Raising the handle 53 lifts the load-counterbalancing weights in inverse order from the poise pan 52.

The gearing which connects the arm 44 to the flexible corrugated tube 25 with its polygonal sheath 26 is so proportioned that with the deposit of each load-counterbalancing weight, a different face of the polygonal sheath 26 is turned to the front. In the weighing scale illustrated, the load-counterbalancing capacity of the pendulums 14 and 15 is 1000 pounds, and the series of evaluating figures on the sheath surface which faces the front and lies in proximity to the edge of the annular chart 22 when all of the load-counterbalancing weights 47—50 are raised off of the poise pan 52 ranges from zero to 1000. The load-counterbalancing capacity of each of the load-counterbalancing weights 47—50 is 1000 pounds. When one of these weights is deposited upon the poise pan 52, the flexible corrugated tube 25 with its sheath 26 is turned to present a sheath face which bears a series of figures ranging from 1000 to 2000; when two load-counterbalancing weights are deposited upon the poise pan 52, the sheath face bearing figures ranging from 2000 to 3000 lies adjacent the chart 21; when three of the load-counterbalancing weights are deposited upon the poise pan 52, the sheath face bearing figures ranging from 3000 to 4000 lies adjacent the chart 21; and when four load-counterbalancing weights are deposited on the poise pan 52, the sheath face bearing figures ranging from 4000 to 5000 lies adjacent the chart 21.

For employment in a weighing scale having a series of four load-counterbalancing weights, the sheath 26 preferably is pentagonal in cross section. If five load-counterbalancing weights are employed, the sheath preferably should be hexagonal in cross section.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, automatic load-counterbalancing mechanism, an indicator hand connected to said automatic load-counterbalancing mechanism to be moved thereby, a fixed chart the surface of which lies in a plane back of said indicator and bears marks adapted to cooperate with said indicator in indicating weights of loads, a flexible member, having flat surfaces, formed into a nearly complete annulus and lying with one of its flat surfaces substantially in the plane of the surface of said fixed chart, said flexible member being turnable about its annular axis to move another of its flat surfaces substantially into the plane of the surface of said fixed chart, said flexible member bearing a plurality of continuous series of evaluating figures, the figures of the several series succeeding in an arithmetical progression, a plurality of unit load-counterbalancing weights adapted to be successively connected to said automatic load-counterbalancing mechanism to augment the load-counterbalancing effect thereof, manually operable means for connecting said unit weights to said automatic load-counterbalancing mechanism, and means connecting said manually operable means to said flexible member to turn the same about its annular axis and thereby selectively locate substantially in the plane of the surface of said fixed chart one of the flat surfaces of said flexible member bearing evaluating figures indicative of loads corresponding to the counterbalancing effect of the unit weights then connected to said automatic load-counterbalancing mechanism plus a portion of the counterbalancing effect of said automatic load-counterbalancing mechanism.

2. In a weighing scale, in combination, automatic load-counterbalancing mechanism, an indicator hand connected to said automatic load-counterbalancing mechanism to be moved thereby, a fixed chart the surface of which lies in a plane back of said indicator and bears marks adapted to cooperate with said indicator in indicating weights of load, a flexible member, having flat surfaces, formed into a nearly complete annulus and lying with one of its flat surfaces substantially in the plane of the surface of said fixed chart, said flexible member having a pinion on each of its ends and being turnable about its annular axis to move another of its flat surfaces substantially into the plane of the surface of said fixed chart, each of said flat surfaces of said flexible member bearing a series of evaluating figures, the figures of the several series succeeding in an arithmetical progression, a plurality of unit load-counterbalancing weights adapted to be successively connected to said automatic load-counterbalancing mechanism to augment the load-counterbalancing effect thereof, manually operable means for connecting said unit weights to said automatic load-counterbalancing mechanism, and means comprising a train of gears and a rack for connecting said manually operable means to said flexible member to turn the same about its annular axis and thereby selectively locate substantially in the plane of the surface of said fixed chart, one of said flat surfaces of said flexible member bearing evaluating figures indicative of loads corresponding to the counterbalancing effect of the unit weights then connected to said automatic load-counterbalancing mechanism plus a portion of the counterbalancing effect of said automatic load-counterbalancing mechanism, said train of gears connecting said manually operable means to said flexible member meshing with such pinions on the ends of said flexible member for simultaneously rotating both ends of said flexible member through the same angle.

HALVOR W. HEM.